UNITED STATES PATENT OFFICE.

ADAM WORTHAGE, OF ST. LOUIS, MISSOURI.

COMPOSITION FOR APPLICATION TO THE SURFACE OF PRINTERS' INKING-ROLLERS.

SPECIFICATION forming part of Letters Patent No. 358,797, dated March 1, 1887.

Application filed September 11, 1886. Serial No. 213,330. (No specimens.)

*To all whom it may concern:*

Be it known that I, ADAM WORTHAGE, a citizen of the United States, residing at the city of St. Louis, in the State of Missouri, have invented an Improved Composition for Application to the Surface of Printers' Inking-Rollers, of which the following is a full, clear, and exact description.

The purpose of this application is to cause the ink to adhere to the surface of green or damp rollers.

The composition consists of distilled or pure rain-water, ten parts; alum, five parts; poke or cocum berry juice, three parts, to which may be added molasses, four parts.

The molasses is not essential, but is added to prevent the souring of the composition when kept unsealed. The "cocum coloring" is the expressed juice of the poke-berry.

The ordinary roller composition is composed of ingredients which very readily absorb the moisture of the air, and when thus charged with an excess of moisture they are swelled beyond their normal size and are useless while in this condition, for the reason that they refuse to take up the ink, and, moreover, if the ink is a little stiff portions of them are apt to stick to the ink-plate and type.

The alum dissolved in rain-water acts upon the swelled roller as an astringent, reducing it to its normal size, and of course rids it of its excess of moisture, and at the same time rids it of a portion of its adhesive ingredient, which result would be fatal if the treatment here stopped; but the poke or cocum berry juice and molasses, or the poke alone, restores to the roller its original adhesive or suction qualities and also heals its surface, thus putting the roller in perfect condition for use. I have found by many experiments that the juice of poke-berry is more efficacious for this purpose than any other substance.

In preparing the composition the water is heated to about a boiling temperature, when the other ingredients are put in. After the alum has dissolved and the ingredients have become thoroughly mixed the composition is allowed to cool. It is then ready for use.

If the composition is intended to be kept any length of time, it should be sealed up in air-tight cans or other hermetically-sealed vessels.

The proportions given above I have determined upon by experiment; but they may be varied without destroying the effective value of the composition.

I claim as my invention—

1. The composition consisting of water, alum, and poke or cocum berry coloring in substantially the proportions set forth.

2. A composition for substantially the purpose described, consisting of alum, poke or cocum berry juice, and molasses, in substantially the proportions set forth.

ADAM WORTHAGE.

Witnesses:
SAML. KNIGHT,
EDW. S. KNIGHT.